United States Patent [19]
Brundage et al.

[11] Patent Number: 5,339,557
[45] Date of Patent: Aug. 23, 1994

[54] DIP NET APPARATUS FOR CATCHING FISH

[76] Inventors: David A. Brundage, 2604 Campden Dr., Austin, Tex. 78745; Jerry E. Jones, 12502 Red Mesa Hollow, Austin, Tex. 78739

[21] Appl. No.: 124,190

[22] Filed: Sep. 21, 1993

[51] Int. Cl.$^5$ .............................................. A01K 77/00
[52] U.S. Cl. ........................................................ 43/11
[58] Field of Search ........................................ 43/7, 11

[56] References Cited

U.S. PATENT DOCUMENTS

| | | | |
|---|---|---|---|
| 574,986 | 1/1897 | Dreifbach . | |
| 2,293,800 | 8/1942 | Brown . | |
| 2,595,597 | 5/1952 | Morseth . | |
| 2,604,715 | 7/1952 | Brown, Jr. . | |
| 2,741,053 | 4/1956 | Moore . | |
| 2,783,573 | 3/1957 | Rau . | |
| 3,747,250 | 7/1973 | Willinge | 43/11 |
| 3,849,926 | 11/1974 | Fox . | |
| 4,029,050 | 6/1977 | Genest | 119/5 |
| 4,034,710 | 7/1977 | Carter | 43/11 |
| 4,118,807 | 10/1978 | McCauley | 43/4 |
| 4,125,956 | 11/1978 | Killian . | |
| 4,138,790 | 2/1979 | Schmucker . | |
| 4,932,150 | 6/1990 | Sher . | |
| 5,099,597 | 3/1992 | Whistle . | |

*Primary Examiner*—Kurt C. Rowan
*Attorney, Agent, or Firm*—Skjerven, Morrill, MacPherson, Franklin & Friel

[57] ABSTRACT

A dip net apparatus for catching fish includes in a preferred embodiment a transparent monofilament netting attached to a substantially-transparent, hollow, tubular rim, which is attached to a substantially-transparent, hollow, tubular handle. An opening within the handle allows water to flow into the hollow interior of both the rim and the handle when immersed underwater, and which renders the rim and handle visually undetectable to nearby fish. The handle includes two openings for receiving the two ends of the rim. An elliptical cross-section of both the rim and the openings in the handle afford assembly of the dip net apparatus by inserting the ends of the rim into the corresponding handle openings and friction locking the rim by twisting the rim relative to the handle.

28 Claims, 10 Drawing Sheets

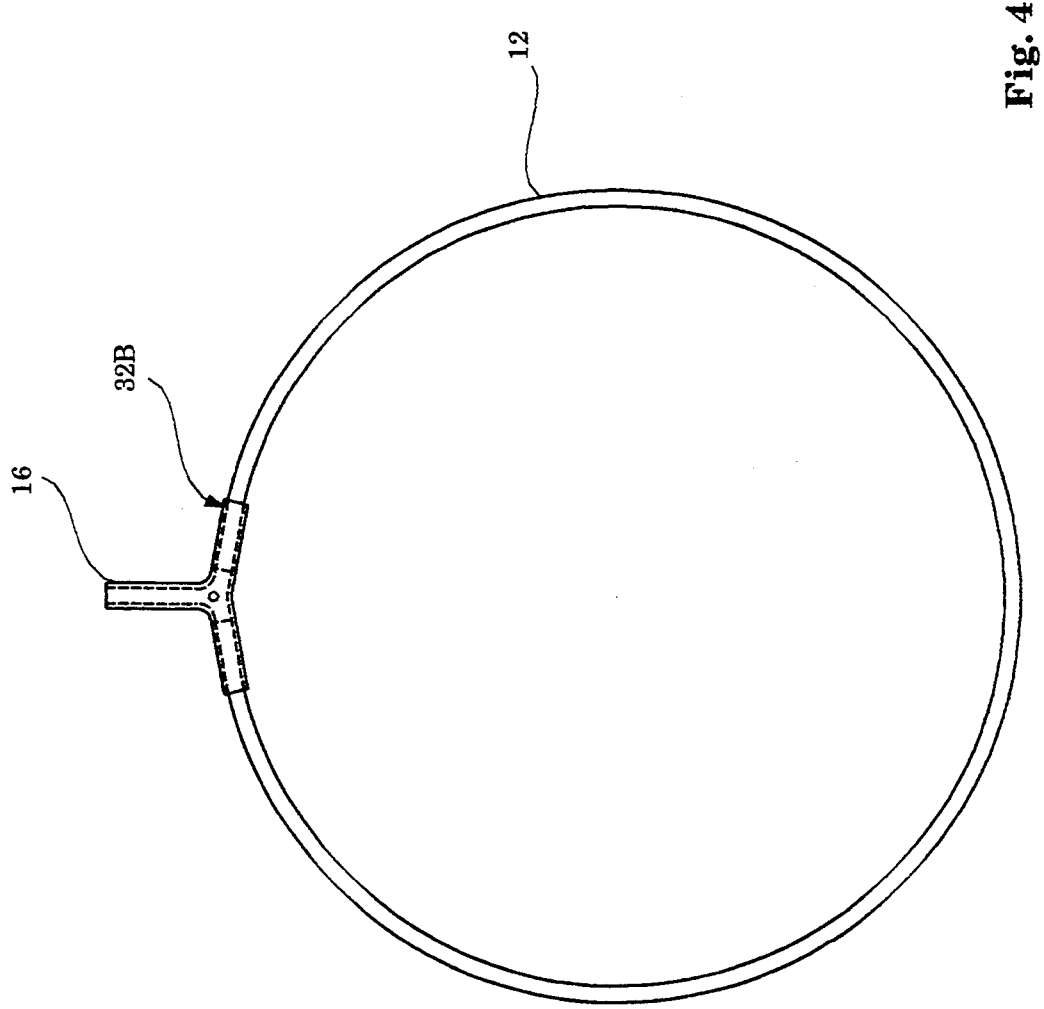

DIP NET APPARATUS FOR CATCHING FISH

BACKGROUND OF THE INVENTION

1. Field of the Invention

This invention relates to fishing nets, and more specifically, to recreational dip nets typically used to catch bait fish and other small fish.

2. Description of Related Art

The art of dip nets for catching fish extends well back in time. A great many examples of dip nets can be found which exhibit a variety of construction techniques for connecting a rim to a handle and for connecting a net to the rim. Aluminum, wood, and fiberglass are frequently used for the rim and the handle, with small metallic hardware frequently used to connect the rim to the handle. Consequently, hand tools are typically required to change the net or to assemble the rim to the handle. Colored netting material, such as nylon, is frequently used.

SUMMARY OF THE INVENTION

Typical dip nets are visible in the water to the fish. The visibility of the dip net hinders the intended purpose of the net by appearing as a foreign object or predator to the fish. When a typical dip net is brought near a group of fish, they become aware of it and usually swim around or away from it. This visibility arises from one or more features of typical dip nets, including the material, shape, and color of the handle and rim, the hardware used to attach the rim to the handle, and the material, color, and construction of the net. Commonly used materials reflect light when underwater, thus providing an undesireable contrast with the ambient water coloration. Also, the hardware frequently used to connect the rim to the handle is very often easily visible underwater, and further, requires the use of hand tools to change the net or to assemble the rim to the handle.

It is an object of the present invention to provide a dip net apparatus which is substantially visually undetectable by nearby fish.

It is a further object of the present invention to provide a dip net apparatus which is easily assembled and disassembled for convenient storage.

It is yet a further object of the present invention to provide a dip net apparatus which requires no hand tools to assemble and disassemble.

Accordingly, in one embodiment of the present invention, a dip net apparatus includes a frame having at least a rim portion, and a net attachable to the rim portion of the frame. The rim portion of the frame is constructed from substantially transparent material, thereby substantially rendering the rim portion of the frame visually undetectable, when underwater, to nearby fish.

In another embodiment of the current invention, a dip net apparatus includes a hollow, tubular handle fashioned of a substantially transparent material, having an opening into its hollow interior for providing a path for water to flow thereinto when submerged underwater. A hollow, tubular rim is attachable to the handle, is likewise fashioned of a substantially transparent material, and has an opening into its hollow interior for providing a path for water to flow thereinto when submerged underwater. A net is attachable to the rim, and the handle and rim, when submerged underwater and filled with water, are rendered substantially visually undetectable to nearby fish.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

FIG. 4 is a frontal view of the rim of the dip net apparatus inserted into the Y-connector shown in FIG. 2;

DETAILED DESCRIPTION OF THE PREFERRED EMBODIMENTS

Figure 1:
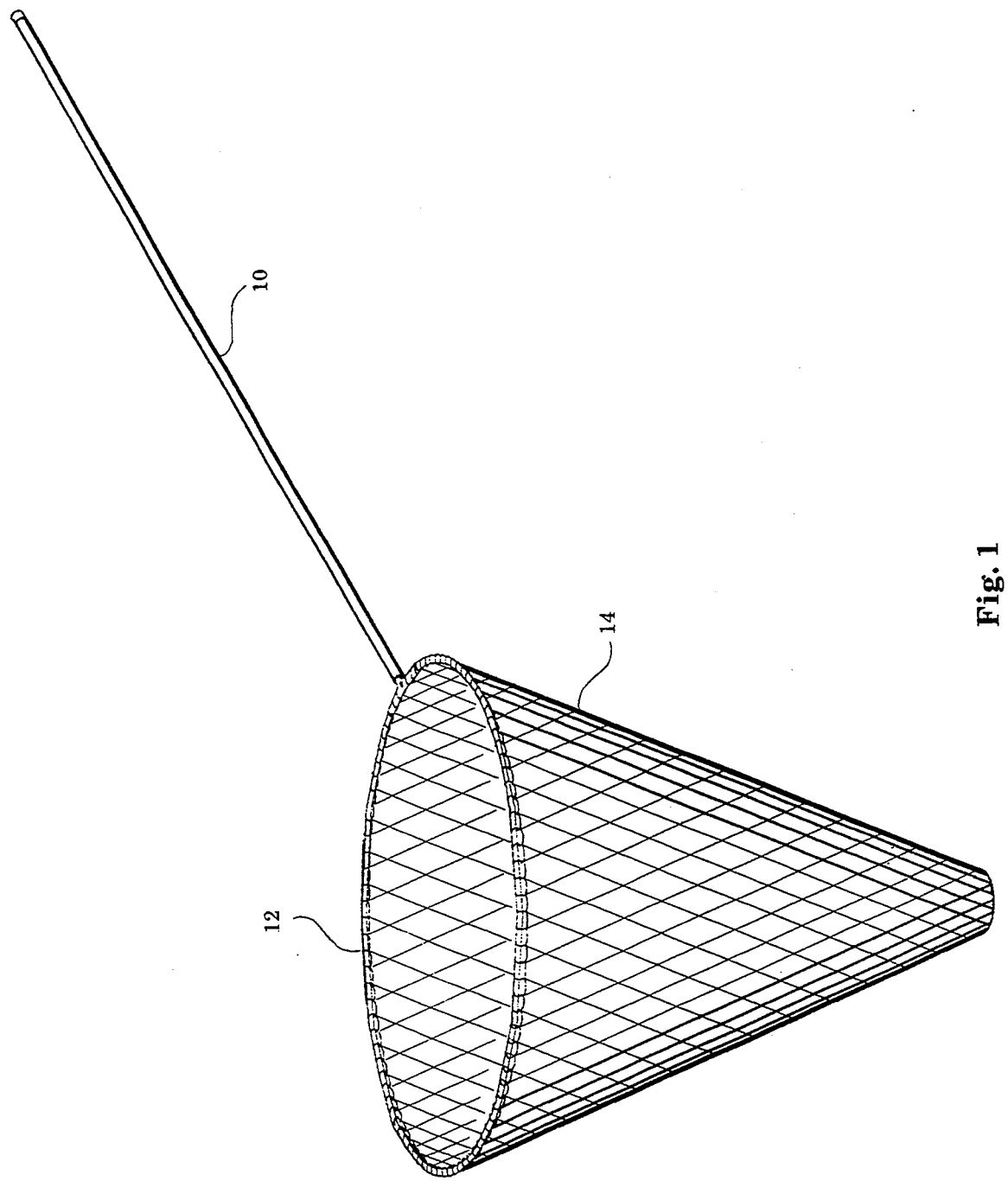
FIG. 1 is an isometric view of a dip net apparatus in accordance with the current invention.

Referring to FIG. 1, a dip net apparatus in accordance with the current invention includes a handle 10, a rim 12 attached to the handle 10, and a net 14 connected to and suspended from the rim 12.

Figure 2:
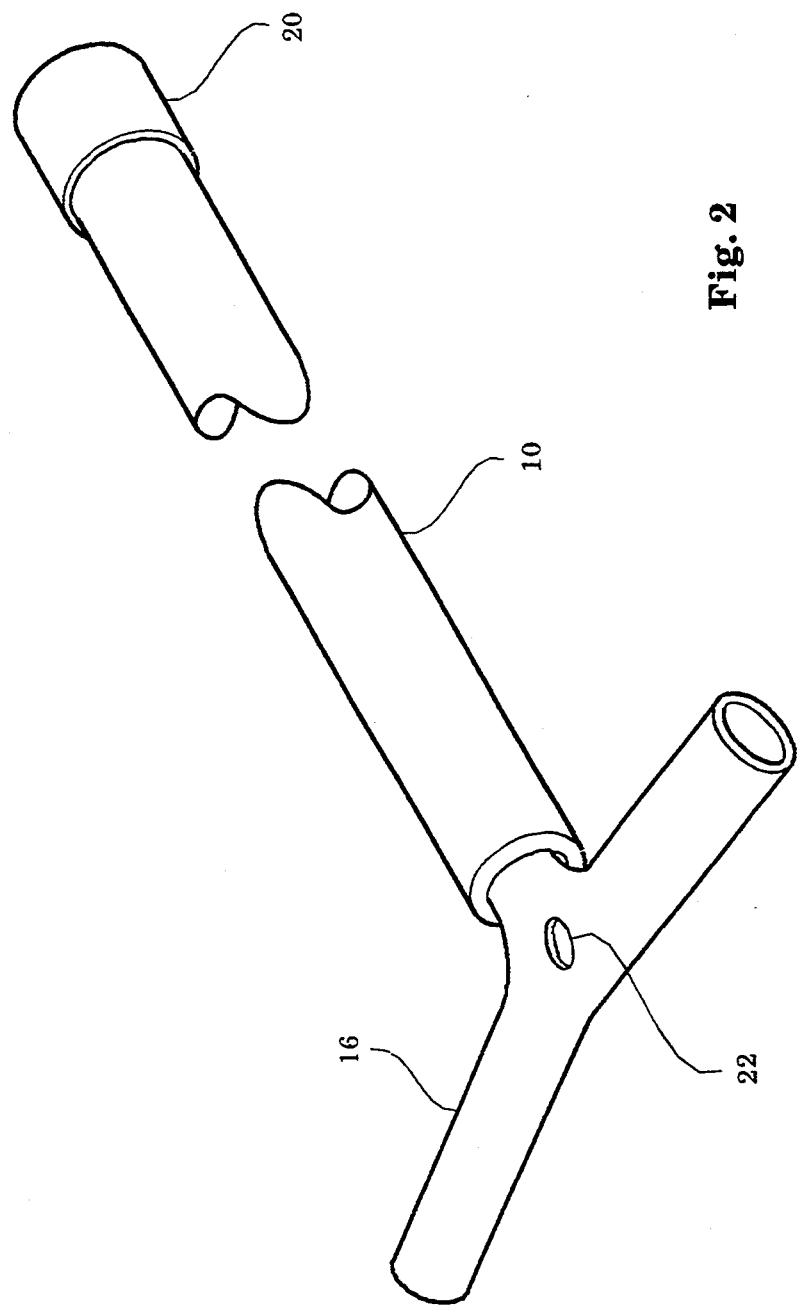
FIG. 2 is an isometric view of a Y-connector attached to the handle of the dip net apparatus shown in FIG. 1, for attaching the rim of the dip net apparatus to the handle.

A more detailed view of the handle 10 is shown in FIG. 2 and which figure also shows a Y-connector 16 attached to the handle 10 for connecting the rim 12 thereto. The handle 10 is preferrably constructed from a substantially transparent tubular material. An end cap 20 covers one open end of the handle 10, while the Y-connector 16 is attached to the opposite end of the handle 10. The Y-connector 16 is preferably constructed from a substantially-transparent material and has three hollow, tubular legs shaped roughly in a Y-shaped fashion. A hole 22 provides an opening into the hollow interior of the Y-connector 16. Both the handle 10 and the Y-connector 16 are preferably fashioned using UV-treated polycarbonate material, but plexiglas and acrylic plastic may also be used to advantage.

Figure 3:
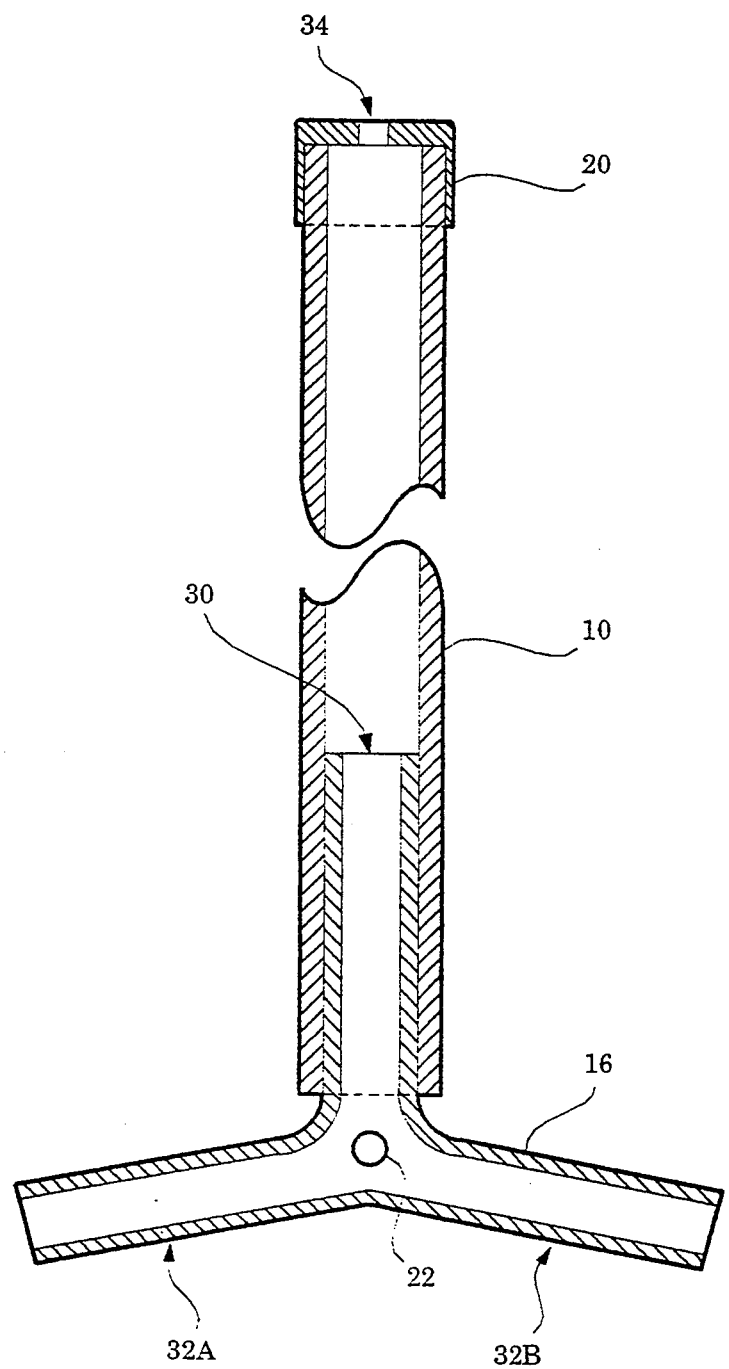
FIG. 3 is a cross-sectional view of the Y-connector as attached to the handle, as shown in FIG. 2.

A cross-sectional view of the handle 10 and Y-connector 16 is shown in FIG. 3. The central leg 30 of the Y-connector 16 extends partially within the hollow handle 10 and may be permanently attached by a solvent or may be removable, as with a friction fitting or some other suitable means of attachment. This leaves the remainder of the handle 10 available for storing the rim 12 when disassembled, as will be discussed hereinafter.

The side legs 32A and 32B of Y-connector 16 are sized to receive the rim 12, as is shown in FIG. 4. The rim 12 is preferably constructed from a substantially-transparent, flexible, hollow tubing, such as UV-treated polycarbonate, but in no way is limited to such a choice. To assemble, the rim 12 is bent into a circular shape and inserted into the side legs 32A and 32B of the Y-connector 16. By using such a flexible material, the rim is not permanently deformed when dented in use due to rough handling, but instead returns to its original shape.

Figure 5A:
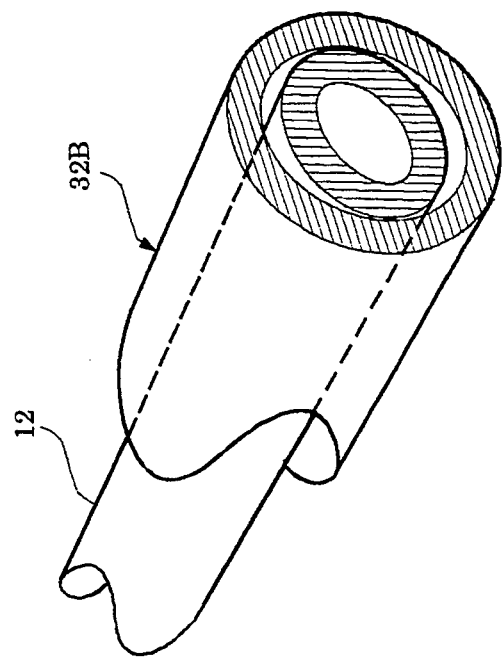
FIGS. 5A and 5B are cross-sectional views of the rim inserted into the Y-connector as shown in FIG. 2, in unlocked and locked positions, respectively.
Figure 5B:
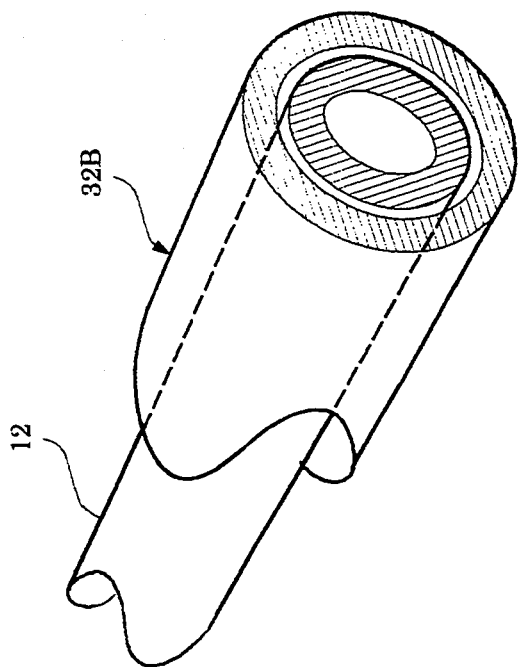

A cross-sectional view of the rim 12 as inserted into side leg 32B is shown in FIG. 5A. The out-of-round cross-sectional shape of both the side legs 32A and 32B and the rim 12 provide for locking the rim 12 into the side legs 32A and 32B by twisting the rim 12, as is shown in FIG. 5B. No hand tools nor any small piece parts are required to lock the rim 12 to the Y-connector 16. The out-of-round shape is preferably an elliptical shape, although a variety of other similar shapes (e.g., egg-shaped) will perform likewise.

Figure 6C:
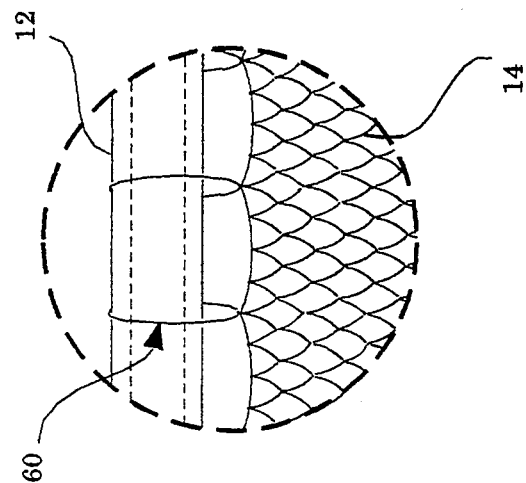
FIG. 6C shows a detail of one embodiment of the attachment of the net to the rim of the dip net apparatus of FIG. 6A.
Figure 6A:
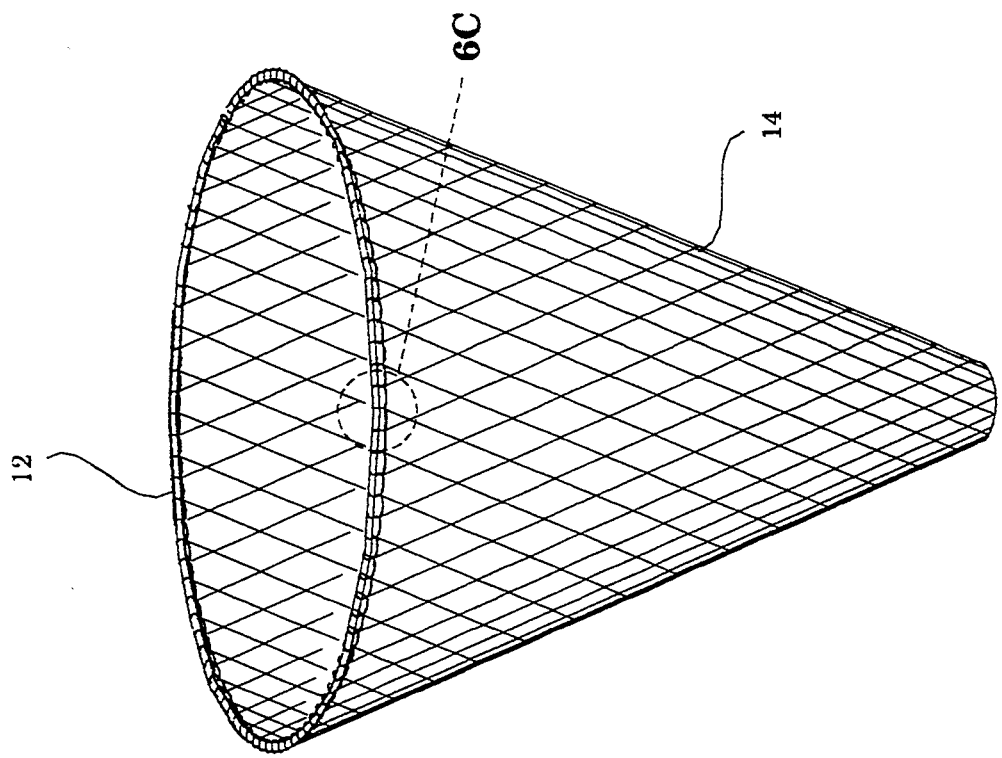
FIG. 6A is an isometric view of the net as attached to the rim of the dip net apparatus of FIG. 1.
Figure 6D:
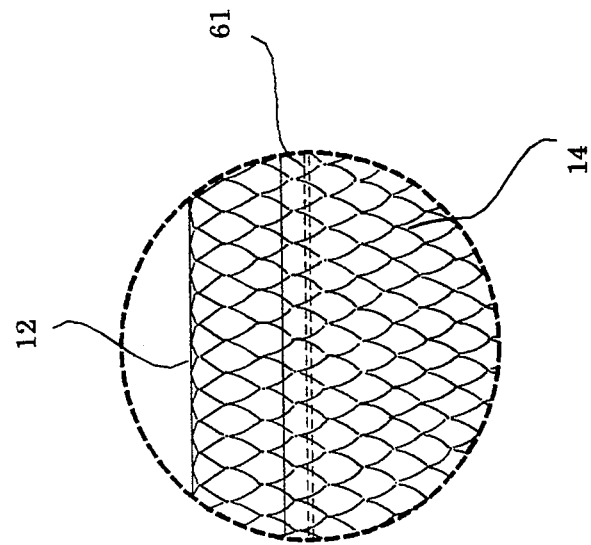
FIG. 6D shows a detail of an alternative embodiment of the attachment of the net to the rim of the dip net apparatus of FIG. 6B.
Figure 6B:
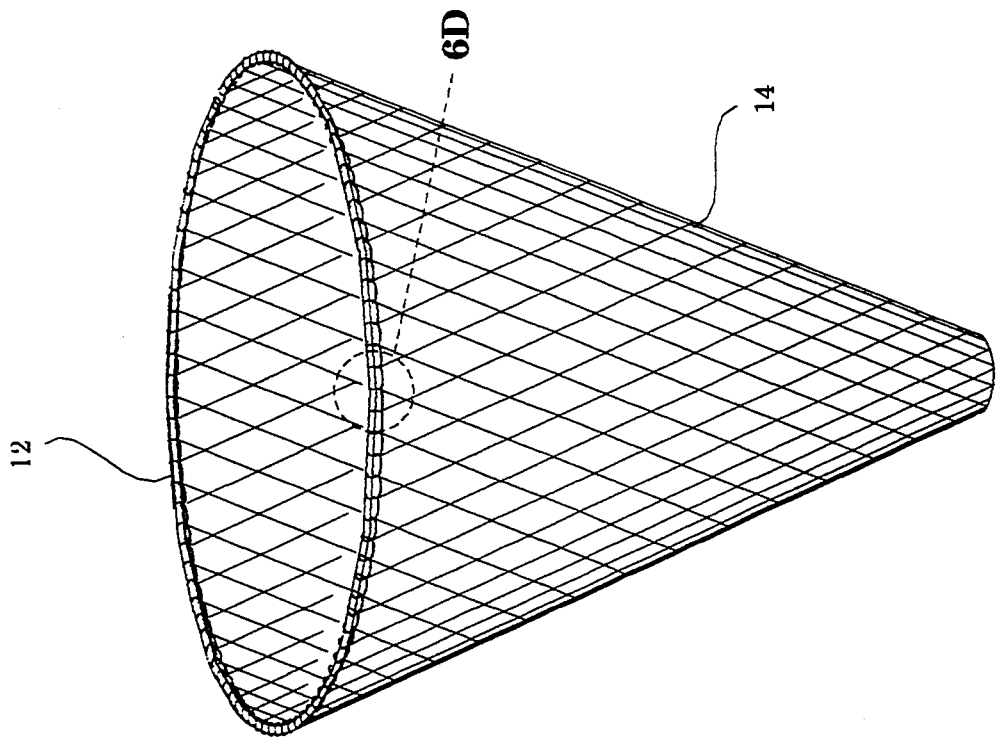
FIG. 6B is an isometric view of the net as attached to the rim of the dip net apparatus of FIG. 1.

FIGS. 6A and 6B are isometric views of the net as attached to the rim of the dip net apparatus of FIG. 1.

FIG. 6C shows a preferred embodiment of a netting arrangement for use with the dip net apparatus as shown in FIG. 6A. As indicated, the rim 12 is inserted through net loops 60 to attach the net 14 to the rim 12. The net loops 60 are spaced at a distance typically larger than the mesh spacing of the net 14, thus minimizing the visibility of the net 14 against the rim 12.

FIG. 6D shows an alternative embodiment of a netting arrangement for use with the dip net apparatus as shown in FIG. 6B. As indicated, the rim 12 is inserted through a folded and stitched seam 61 to attach the net 14 to the rim 12.

When the assembled dip net apparatus thus far described is immersed underwater, the hollow interiors of the handle 10, the Y-connector 16, and the rim 12 each fill with water as a result of the hole 22 within the Y-connector 16. The hole 34 in the end cap 20 provides an air escape as the water fills the interior of the handle. This virtually renders the dip net apparatus visually undetectable to nearby fish, as the coloration of the rim and handle assumes the coloration of the ambient water. In use, fish typically swim directly into such a dip net apparatus, as contrasted to previous nets, which fish will typically swim around or away from.

Figure 7:
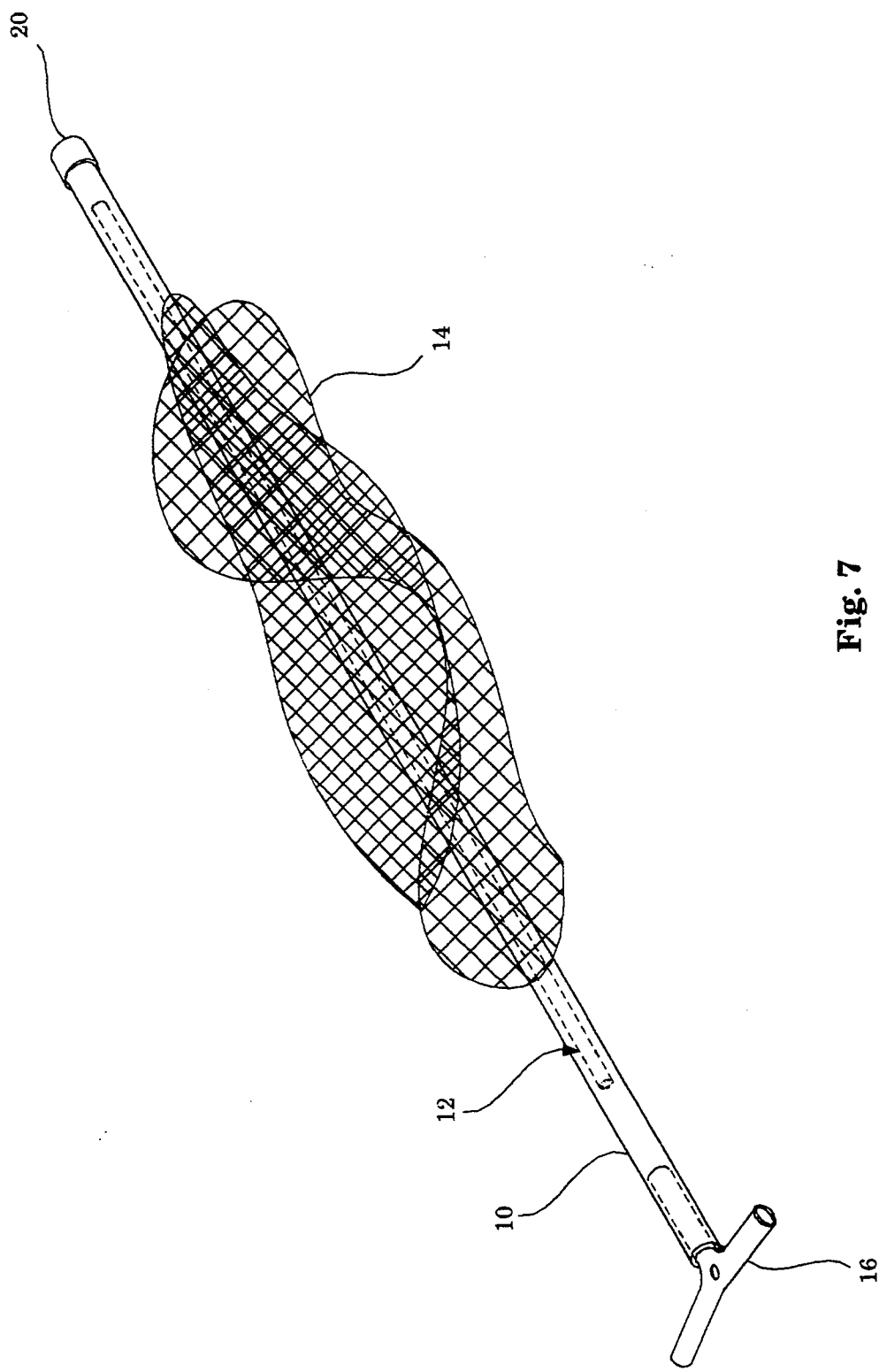
FIG. 7 is an isometric view of the dip net apparatus of FIG. 1, showing the disassambled rim stored within the handle and the unattached net wrapped around the handle for storage.

FIG. 7 illustrates a disassembled dip net apparatus as in FIG. 1. The rim 12 is stored within the hollow tubular handle 10, with the end cap 20 preventing the rim 12 from falling out. The net 14 is wrapped around the handle 10, providing a compact structure for easy storage.

Figure 8:
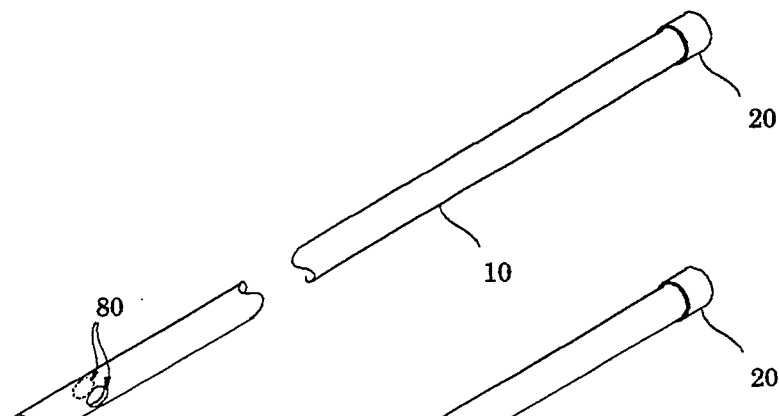
FIG. 8 is an isometric view showing an alternative embodiment of the handle for connecting the rim thereto for a dip net apparatus as shown in FIG. 1.

FIG. 8 illustrates an alternative embodiment for connecting the rim 12 to the handle 10. Two out-of-round (e.g., elliptical) holes 80 are fashioned in the tubular wall of the handle 10 to provide locking connection points for both ends of the rim 12.

Figure 9:
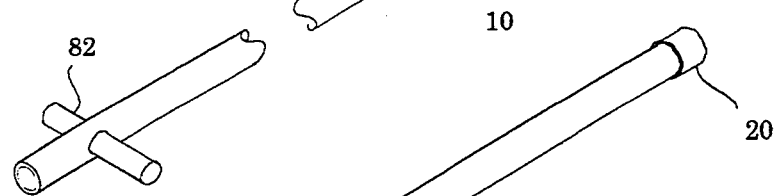
FIG. 9 is an isometric view showing a second alternative embodiment of the handle for connecting the rim thereto for a dip net apparatus as shown in FIG. 1.

FIG. 9 illustrates a second alternative embodiment for connecting the rim 12 to the handle 10. An elliptical tube 82 is inserted through and attached to the tubular wall of the handle 10 to provide locking connection points for both ends of the rim 12.

Figure 10:
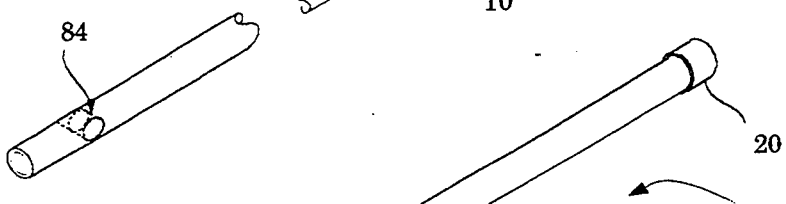
FIG. 10 is an isometric view showing a third alternative embodiment of the handle for connecting the rim thereto for a dip net apparatus as shown in FIG. 1.

FIG. 10 illustrates a third alternative embodiment for connecting the rim 12 to the handle 10. An elliptical tube 84 is inserted through and attached to the tubular wall of the handle 10, flush with the outer surface of the handle 10, to provide locking connection points for both ends of the rim 12.

Figure 11:
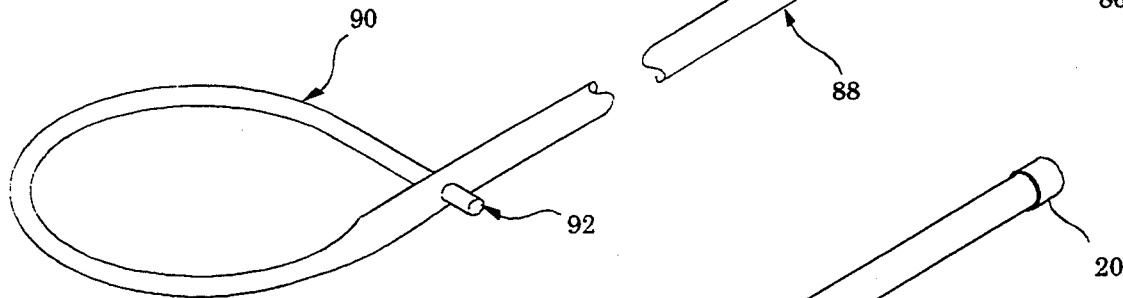
FIG. 11 is an isometric view showing an embodiment of a combined handle and rim for a dip net apparatus as shown in FIG. 1.

FIG. 11 illustrates an alternative embodiment for a combined rim and handle 86. The handle portion 88 narrows to a rim portion 90 having a smaller diameter than the handle portion 88. Two holes 92 are fashioned in the tubular wall of the handle portion 88 to provide a locking connection for the rim portion 90.

Figure 12:
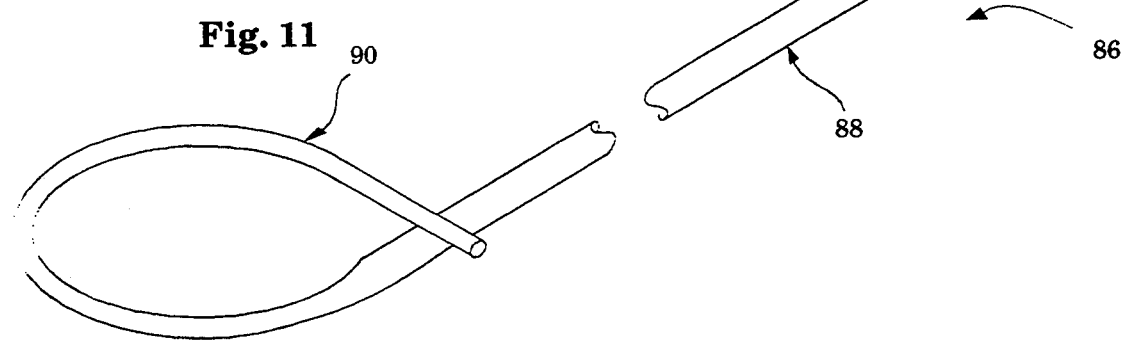
FIG. 12 is an isometric view showing a second alternative embodiment of a combined handle and rim for a dip net apparatus as shown in FIG. 1.

FIG. 12 illustrates a similar alternative embodiment for a combined rim and handle 86. The preformed character of the rim portion 90 defines a somewhat circular shape even though no attachment is provided to the handle portion 88.

Figure 13:
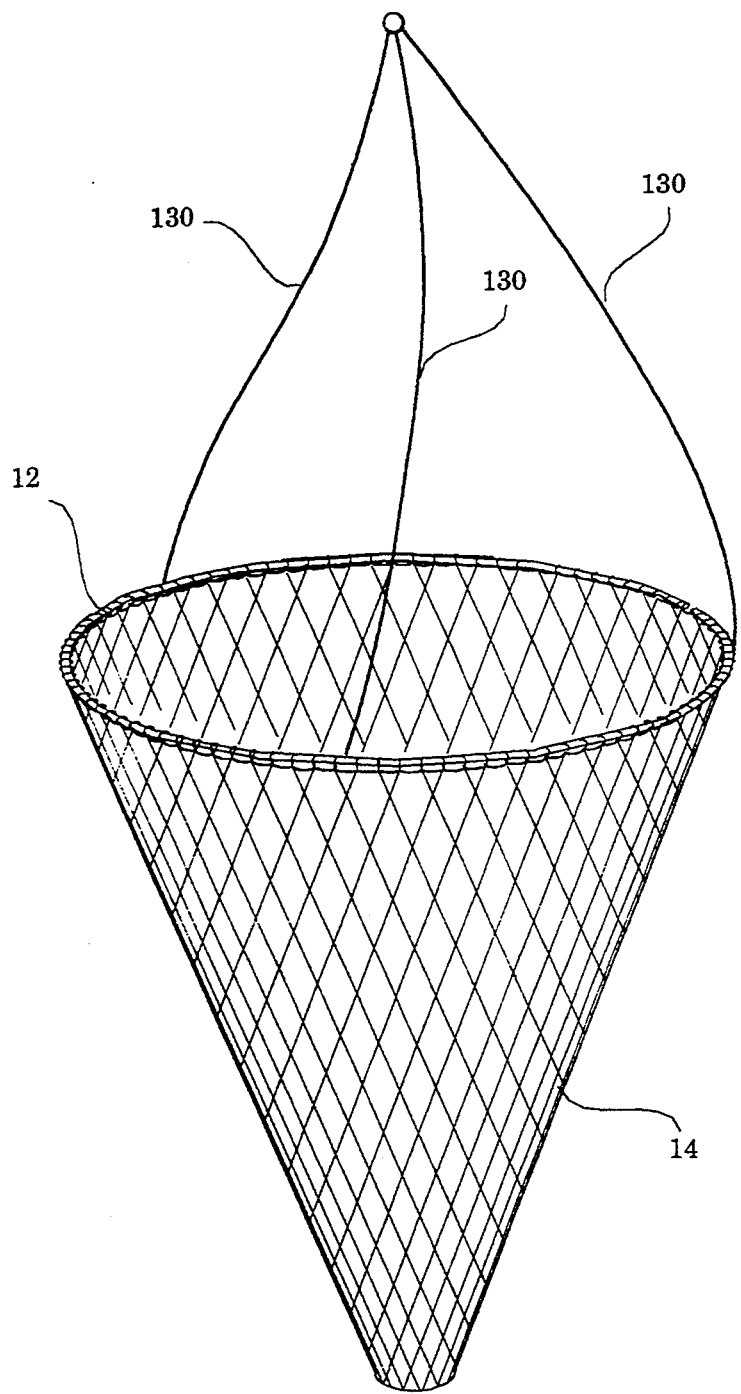
FIG. 13 is an isometric view showing an embodiment of a dip net apparatus having no handle.

FIG. 13 illustrates an embodiment for a dip net apparatus without any handle. A group of tethers 130 connect to the rim 12 and join together to provide a means to lift such a net (together with the caught fish) from the water.

While the invention has been described with respect to the embodiments set forth above, the invention is not necessarily limited to these embodiments. For example, the invention is not necessarily limited to implementation using hollow tubing. A rim of solid, transparent tubing affords a dip net apparatus reasonably visually undetectable to fish. While the out-of-round nature of the rim 12 described in these embodiments afford a dip net apparatus that is assembled with no hand tools, alternatively, other arrangements may be used. For example, a round, tapered rim 12 may be used to achieve a press-fit of the rim into the handle 10 or the Y-connector 16. Accordingly, other embodiments, variations, and improvements not described herein are not necessarily excluded from the scope of the invention, which is defined by the following claims.

What is claimed is:

1. A dip net apparatus for catching fish comprising:
    a frame having a rim portion thereof;
    a net attachable to the rim portion of the frame;
    wherein the rim portion of the frame is constructed from substantially transparent material, thereby substantially rendering the rim portion of the frame visually undetectable, when underwater, to nearby fish.

2. An apparatus as in claim 1:
    wherein the rim portion of the frame is of hollow contruction; and
    wherein the frame includes an opening into the hollow interior of the rim portion for providing a path for water to fill the hollow interior of the rim portion when submerged below water, thereby rendering the coloration of the rim portion nearly identical to the coloration of the water.

3. An apparatus as in claim 1 wherein the frame further includes an elongated handle portion thereof.

4. An apparatus as in claim 3 wherein the handle portion of the frame is constructed from a substantially transparent material.

5. An apparatus as in claim 4:
wherein the rim portion is of hollow construction; and
wherein the frame includes an opening into the hollow interior of the rim portion for providing a path for water to fill the hollow interior of the rim portion when submerged below water, thereby rendering the coloration of the rim portion nearly identical to the coloration of the water.

6. An apparatus as in claim 5:
wherein the handle portion is of hollow construction; and
wherein the frame includes an opening into the hollow interior of the handle portion for providing a path for water to fill the hollow interior of the handle portion when submerged below water, thereby rendering the coloration of the handle portion nearly identical to the coloration of the water.

7. An apparatus as in claim 1 wherein the net is comprised of a substantially transparent monofilament netting having a certain mesh spacing.

8. An apparatus as in claim 1 wherein the net includes a single row of loops for attaching the net to the rim portion, said loops being spaced at a distance wider than the certain mesh spacing.

9. An apparatus as in claim 1 wherein the net includes a folded and stitched seam for attaching the net to the rim portion.

10. An apparatus as in claim 1 wherein the frame is fashioned from a material chosen from the group consisting of UV-treated polycarbonate, pre-formed plexiglas, and acrylic plastic material.

11. An apparatus as in claim 1 wherein the frame is fashioned from a flexible material whereby, in use, the frame returns to its original shape after and in spite of deformation due to rough handling.

12. A dip net apparatus for catching fish comprising:
a handle;
a rim attachable to the handle;
a net attachable to the rim;
wherein the rim is constructed from substantially transparent material, thereby substantially rendering the rim visually undetectable, when underwater, to nearby fish.

13. A dip net apparatus as in claim 12:
wherein the rim is of hollow contruction; and
wherein the rim includes an opening for providing a path for water to fill the hollow interior of the rim when submerged below water, thereby rendering the coloration of the rim nearly identical to the coloration of the water.

14. A dip net apparatus as in claim 12:
wherein the rim has an out-of-round cross-section; and
wherein the handle has two openings, each having an out-of-round cross-section suitable for receiving one end of the rim thereinto and for friction-locking the rim thereto, without requiring hand tools, by twisting the rim with respect to the handle.

15. A dip net apparatus as in claim 12:
wherein the rim has an out-of-round cross-section; and
further comprising a Y-connector having a central leg attachable to the handle, and having two symmetrical hollow side legs, each side leg having an out-of-round cross-section suitable for receiving one end of the rim thereinto and for friction-locking the rim thereto, without requiring hand tools, by twisting the rim with respect to the handle.

16. A dip net apparatus as in claim 14 wherein the out-of-round cross section is an elliptical cross-section.

17. A dip net apparatus as in claim 12 wherein the net is comprised of a substantially transparent monofilament netting having a certain mesh spacing.

18. A dip net apparatus as in claim 12 wherein the net includes a single row of loops for attaching the net to the rim, said loops being spaced at a distance wider than the certain mesh spacing.

19. An apparatus as in claim 12 wherein the net includes a folded and stitched seam for attaching the net to the rim.

20. A dip net apparatus as in claim 12 wherein the handle and the rim are fashioned from a material chosen from the group consisting of UV-treated polycarbonate, pre-formed plexiglas, and acrylic plastic material.

21. A dip net apparatus for catching fish and the like, comprising:
a hollow, tubular handle comprised of a substantially transparent material, having an opening into its hollow interior for providing a path for water to flow thereinto when submerged underwater;
a hollow, tubular rim attachable to the handle, the rim comprised of a substantially transparent material, having an opening into its hollow interior for providing a path for water to flow thereinto when submerged underwater; and
a net attachable to the rim;
whereby the handle and rim, when submerged underwater and filled with water, are rendered substantially visually undetectable to nearby fish.

22. A dip net apparatus as in claim 21:
wherein the rim has an elliptical cross-section; and
further comprising a hollow Y-connector having a hollow central leg attachable to the handle, and having two symmetrical hollow side legs, each side leg having an elliptical cross-section for receiving one end of the rim thereinto and for friction-locking the rim thereto, without requiring hand tools, by twisting the rim with respect to the handle.

23. A dip net apparatus as in claim 22 further comprising means for water to flow therethrough when submerged underwater, thereby filling the connected interiors of the handle, the Y-connector, and the rim with water.

24. A dip net apparatus for catching fish and the like, which is assembled and disassembled without hand tools, comprising:
a hollow, tubular handle comprised of a substantially transparent material;
a hollow Y-connector having a hollow central leg fixably attached to the handle, having an opening into its hollow interior for providing a path for water to flow thereinto when submerged underwater, and having two symmetrical hollow side legs;
a hollow, tubular rim attachable to the Y-connector, the rim comprised of a substantially transparent material;
a net attachable to the rim;

whereby the dip net apparatus is assembled by inserting each end of the rim into the respective side leg of the Y-connector, thereby connecting the interior regions of the rim, the Y-connector, and the handle; and whereby the handle, the Y-connector, and the rim, when submerged underwater and filled with water via the opening within the Y-connector, are rendered substantially visually undetectable to nearby fish.

25. A dip net apparatus as in claim 24:

wherein the rim has an elliptical cross-section; and wherein the side legs of the Y-connector have an elliptical cross-section of a size appropriate for receiving one end of the rim thereinto and for friction-locking the rim thereto, without requiring hand tools, by twisting the rim with respect to the handle.

26. A dip net apparatus as in claim 25 wherein the net is comprised of a transparent monofilament netting having a certain mesh spacing.

27. A dip net apparatus as in claim 26 wherein the net includes a single row of loops for attaching the net to the rim, said loops being spaced at a distance wider than the certain mesh spacing.

28. A dip net apparatus as in claim 27 wherein the handle and the rim are fashioned from UV-treated polycarbonate.

* * * * *